United States Patent Office 3,289,150
Patented Nov. 29, 1966

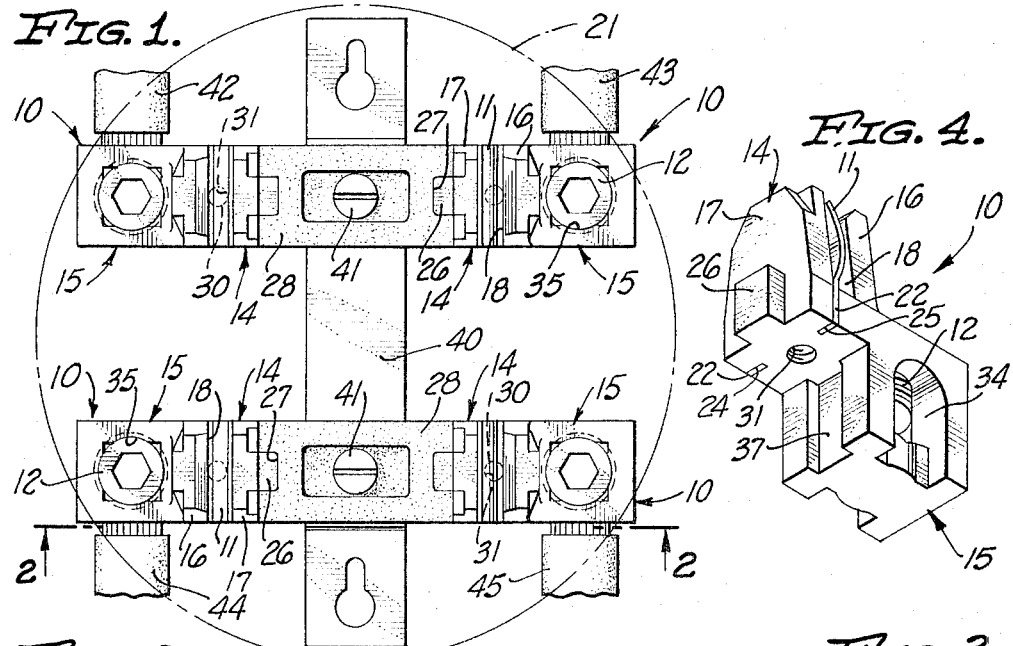

3,289,150
PLUG-IN METER JAW
Rex E. Sturdivan, Whittier, Calif., assignor to Zinsco Electrical Products, Los Angeles, Calif., a corporation of California
Filed Apr. 27, 1964, Ser. No. 362,590
8 Claims. (Cl. 339—192)

This invention relates to electrical terminals and, in particular, to a new and improved plug-in socket for electrical meters, such as the conventional watt hour meter used for measuring power consumption by customers of electrical utilities.

In present-day installations, the watt hour meter is usually a plug-in component facilitating meter replacement for inspection and maintenance. It is customary to utilize some type of meter socket having a spring element for engaging a meter stab and a screw element for connecting a cable, bus bar or other conductor thereto. The conventional plug-in meter socket is assembled from a plurality of pieces, usually stamped from sheet stock or cut from bar stock, resulting in several metal interfaces which introduce problems of electrical contact resistance and heat transfer resistance as well as cost problems in stocking the components and assembling the completed socket.

It is an object of the present invention to provide a new and improved plug-in meter socket which is made of a single unitary piece of metal requiring only a spring for urging the meter stab against the socket and a screw or bolt for connecting the conductor to the meter socket. It is a specific object of the invention to provide such a plug-in meter socket which is cast in a single operation.

It is an object of the invention to provide a new and improved meter socket utilizing a unitary jaw and lug to provide low electrical resistance between the meter and the conductor and to provide high heat transfer between the meter and the conductor. A further object is to provide such a structure which is particularly adapted for use at higher current ratings such as in the 100 amperes and up range.

It is a specific object of the invention to provide a new and improved plug-in meter socket including a unitary jaw and lug of electrical conducting material and having a jaw portion with a rigid upstanding arm defining a meter stab receiving space and a lug portion for direct connection of an electrical conductor thereto, and a spring member carried on the jaw portion for urging a meter stab disposed in the meter space against the arm. A further object is to provide such a plug-in meter socket which can be adapted for use with wire cable conductors, for use with a bus bar, and for use with other forms of conductors.

It is an object of the invention to provide a new and improved plug-in meter socket assembly incorporating four such jaw units mounted in pairs on insulating blocks for receiving a conventional four-prong plug-in meter. An additional object is to provide a meter socket which can be directly supported by an electrical bus bar without requiring insulating support blocks.

The invention also comprises novel details of construction and novel combinations and arrangements of parts, which will more fully appear in the course of the following description. The drawing merely shows and the description merely describes preferred embodiments of the present invention which are given by way of illustration or example.

In the drawing:
FIG. 1 illustrates a complete plug-in meter socket assembly with a meter positioned therein;
FIG. 2 is a sectional view along the line 2—2 of FIG. 1;
FIG. 3 is an end view of the structure of FIG. 2;
FIG. 4 is an isometric view of one of the meter sockets of the invention;
FIG. 5 is an end view corresponding to that of FIG. 3 of an alternative form of the invention; and
FIG. 6 is an end view of another alternative form of the invention.

The socket of FIG. 4 includes a jaw and lug unit 10, a spring 11, and a screw 12. The jaw and lug unit is made of a single piece of metal, preferably being die cast of electrical grade aluminum to provide a single homogeneous unit.

The jaw and lug unit 10 has a jaw portion 14 and a lug portion 15. The jaw portion preferably incorporates a pair of spaced rigid upstanding arms 16, 17 providing a meter stab receiving slot 18 therebetween. The spring member 11 is carried in the slot 18 and acts to urge a stab terminal 20 of a meter 21 into firm electrical and mechanical contact with one of the arms of the socket (FIG. 2). In the preferred form illustrated herein, the spring member is an arcuate shaped piece of resilient metal, such as Phosphor bronze, and includes a base section 22 having a T-shaped slot therein to provide a pair of spaced arms. The spaced arms of the base section are disposed in corresponding grooves 24, 25 of the jaw portion 14, with the inter-engaging T-shape providing for retaining the spring member in place.

The jaw portion 14 may also include an indexing lug 26 for engaging a corresponding notch 27 of an insulating support block 28. The jaw portion 14 may rest on a shoulder 29 of the support block and be affixed thereto by means of a screw 30 which passes through the block and engages a tapped opening 31 in the jaw portion of the socket unit.

A transverse opening 34 is provided in the lug portion 15 for receiving an electrical conductor. The screw 12 is positioned in a tapped opening 35 which is perpendicular to and intersects the opening 34 for clamping a conductor in the lug portion, as best seen in FIG. 1. A groove 37 may be provided in the lug portion for engaging a boss 38 of the block 28 to aid in maintaining the alignment of the jaw and lug unit with the support block.

The various portions of the jaw and lug unit are made quite thick so as to have minimum electrical resistance and maximum heat transfer capabilities. In a typical unit having a 200 amperes rating, no cross section through the device is less than about ¼ inch thick. This provides a rugged and simple shape which is easily manufactured and which meets the objectives set out above. It should be noted that while a two-arm jaw portion is preferred as illustrated herein, the device could be made with only a single arm against which the meter stab is clamped by the spring member.

The most conventional metal utilizes four stab terminals calling for a meter socket assembly incorporating four plug-in sockets. In the preferred embodiment illustrated herein, two sockets are carried on an insulating block, as seen in FIG. 2. Two such insulating blocks are then mounted in spaced relation to provide the complete assembly of FIG. 1. In the preferred embodiment illustrated herein, each insulating block is provided with a central mounting channel 39 for receiving a support strap or bracket 40 to which the block is attached by a screw 41. The bracket 40 carrying two insulating blocks and four sockets may then be mounted in any conventional electrical distribution box, meter protective enclosure, or otherwise as desired. The line conductors 42, 43 are connected to two of the sockets and the load conductors 44, 45 are connected to the other two sockets. The meter 21 may be plugged in and removed as desired.

An alternative form of the socket is shown in FIG. 5. Only the lug portion of the jaw and lug unit differs in this embodiment, this particular embodiment being adapted for utilization with a bus bar instead of flexible cable conductors.

The jaw portion 14 of the unit of FIG. 5 is the same as that of the earlier described embodiment, and elements are identified by the same reference numerals. A U-shaped lug portion 50 has a pair of arms 51, 52 projecting away from the base of the jaw portion 14 for straddling the support block 28, with the base of the jaw portion resting on the support block shoulder 29. The ends of the arms 51, 52 are turned outward providing lugs 53, 54 having openings 55 therethrough for attachment to bus bars or other conductors by means of bolts or screws.

The socket of FIG. 5 may be supported on the bus bar with the insulating support block 28 omitted. One such arrangement is shown in FIG. 6, wherein the lug 53 of arm 51 is bolted to a bus bar 60, providing both mechanical support for the sockets and electrical connection thereto. Only one arm 51 need be in the lug portion 50. Of course, the socket of FIG. 6 can be mounted on a support block in the same manner as the other sockets if desired. In a typical installation, the pair of line sockets or the pair of load sockets or both pairs may be directly mounted on a bus bar carried within the distribution box.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a plug-in meter socket, the combination of:
a unitary jaw and lug formed of a single homogeneous piece of electrical conducting material and having a jaw portion including a rigid upstanding arm defining a meter stab receiving space, and having a lug portion for direct connection of an electrical conductor thereto; and
a spring member carried on said jaw portion for urging a meter stab disposed in said space against said arm.

2. In a plug-in meter socket, the combination of:
a unitary jaw and lug of electrical conducting material and having a jaw portion including a rigid upstanding arm defining a meter stab receiving space and means defining opposed grooves in said jaw portion adjacent said arm and directed away from the base of said arm with the spacing between said grooves greater at said base, and having a lug portion for direct connection of an electrical conductor thereto; and
a spring member having a T-shaped opening at one end engaged in said grooves, with the major portion of said member disposed in said space for urging a meter stab in said space against said arm.

3. In a plug-in meter socket, the combination of:
a unitary jaw and lug formed of a single homogeneous piece of electrical conducting material and having a jaw portion including a pair of spaced, rigid upstanding arms defining a meter stab receiving slot therebetween, and having a lug portion for direct connection of an electrical conductor thereto; and
a spring member carried in said slot adjacent one of said arms for urging a meter stab disposed in said slot against the other of said arms.

4. In a plug-in meter socket, the combination of:
a unitary jaw and lug of cast aluminum and having a jaw portion including a pair of spaced upstanding arms defining a meter stab receiving slot therebetween, and having a lug portion offset from said jaw portion and including means defining a first cable receiving opening and a second screw receiving opening intersecting said first opening;
a screw positioned in said second opening for clamping a cable in said first opening; and
a spring member carried in said slot adjacent one of said arms for urging a meter stab in said slot against the other of said arms.

5. In a plug-in meter socket, the combination of:
a unitary jaw and lug formed of a single homogeneous piece of cast aluminum and having a jaw portion including a pair of spaced upstanding arms defining a meter stab receiving slot therebetween, and having a lug portion extending from the base of said slot to tab means for clamping to an electrical conductor; and
a spring member carried in said slot adjacent one of said arms for urging a meter stab in said slot against the other of said arms.

6. In a plug-in meter socket, the combination of:
a unitary jaw and lug of cast aluminum and having a jaw portion including a pair of spaced upstanding arms defining a meter stab receiving slot therebetween, and having a U-shaped lug portion with the bight of said U forming the base of said slot and with the ends of the arms of said U turned outwards providing tab means for clamping to an electrical conductor; and
a spring member carried in said slot adjacent one of said arms for urging a meter stab in said slot against the other of said arms.

7. In a plug-in meter socket, the combination of:
a pair of bus bars adapted for mounting in an electrical distribution box in spaced insulated relation;
a pair of unitary jaw units of electrical conducting material, each of said jaw units having a jaw portion including a pair of spaced, rigid upstanding arms defining a meter stab receiving slot therebetween, and having a lug portion for direct connection of an electrical conductor thereto;
a spring member carried in the slot of each of said jaw units, with each spring member disposed adjacent one of the arms for urging a meter stab in the slot against the other of the arms; and
means for mounting each of said jaw units on a corresponding one of said bus bars.

8. In a plug-in meter socket, the combination of:
four unitary jaw units of electrical conducting material, each of said jaw units having a jaw portion including a pair of spaced, rigid upstanding arms defining a meter stab receiving slot therebetween, and having a lug portion for direct connection of an electrical conductor thereto;
a spring member carried in the slot of each of said jaw units, with each spring member disposed adjacent one of the arms for urging a meter stab in the slot against the other of the arms;
first and second support blocks of electrical insulating material, each block having upwardly facing jaw unit mounting shoulders at opposite ends thereof and a downwardly facing block mounting channel intermediate said ends;
means for affixing a jaw unit onto each mounting shoulder of each support block; and
a support bracket positioned in said block mounting channels with said blocks affixed thereto in spaced relationship.

References Cited by the Examiner

UNITED STATES PATENTS

| | | | |
|---|---|---|---|
| 2,880,380 | 3/1959 | Schmidt et al. | 339—31 X |
| 3,131,984 | 5/1964 | Kobryner | 339—91 |
| 3,141,719 | 7/1964 | Moore | 339—112 |

FOREIGN PATENTS 535,810  4/1941  Great Britain.

EDWARD C. ALLEN, *Primary Examiner.*

W. DONALD MILLER, *Examiner.*